United States Patent
Magyari

(10) Patent No.: US 7,066,156 B2
(45) Date of Patent: Jun. 27, 2006

(54) FUEL VAPORIZATION SYSTEMS FOR VAPORIZING LIQUID FUEL

(75) Inventor: Douglas Magyari, Royal Oak, MI (US)

(73) Assignee: Mag Ultra Phase, LLC, Pleasant Ridge, MI (US)

(*) Notice: Subject to any disclaimer, the term of this patent is extended or adjusted under 35 U.S.C. 154(b) by 45 days.

(21) Appl. No.: 10/494,878

(22) PCT Filed: Nov. 7, 2002

(86) PCT No.: PCT/US02/35746

§ 371 (c)(1),
(2), (4) Date: May 7, 2004

(87) PCT Pub. No.: WO03/098019

PCT Pub. Date: Nov. 27, 2003

(65) Prior Publication Data

US 2004/0237948 A1 Dec. 2, 2004

Related U.S. Application Data

(60) Provisional application No. 60/338,904, filed on Nov. 7, 2001.

(51) Int. Cl.
*G02F 1/35* (2006.01)
(52) U.S. Cl. ..................... 123/538; 123/557
(58) Field of Classification Search ........ 123/536–538, 123/543–557, 143 B; 219/121.6, 121.86; 431/11

See application file for complete search history.

(56) References Cited

U.S. PATENT DOCUMENTS

| 4,434,753 A | * | 3/1984 | Mukainakano et al. . 123/143 B |
| 4,480,622 A | | 11/1984 | Hoffman |
| 4,483,307 A | * | 11/1984 | Gilmor ........................ 123/558 |
| 4,524,746 A | | 6/1985 | Hansen |
| 4,726,336 A | * | 2/1988 | Hoppie et al. ............... 123/292 |
| 4,937,421 A | * | 6/1990 | Ortiz et al. ............ 219/121.68 |
| 5,040,518 A | | 8/1991 | Hamm |
| 5,218,944 A | | 6/1993 | Leonard |
| 5,291,870 A | | 3/1994 | Covey, Jr. |

(Continued)

FOREIGN PATENT DOCUMENTS

JP 04058230 A * 2/1992

OTHER PUBLICATIONS

PCT International Search Report (PCT/US02/35746).

*Primary Examiner*—Marguerite McMahon
(74) *Attorney, Agent, or Firm*—Brooks Kushman P.C.

(57) ABSTRACT

One aspect of the present invention is a system for vaporizing liquid fuel which utilizes photonic energy and minimal thermal energy. The system generally comprises a fuel delivery system for delivering liquid fuel and a vaporization system for vaporizing liquid fuel delivered by the fuel delivery system. The vaporization system provides a vaporized fuel temperature of at least about 5 degrees cooler than the ambient temperature of air adjacent to the vaporization system. Another aspect of the present invention relates to systems for altering and controlling the chemical makeup of fuels and chemical processing of fuels and other compounds.

13 Claims, 2 Drawing Sheets

U.S. PATENT DOCUMENTS

| | | |
|---|---|---|
| 5,328,665 A | 7/1994 | Geiger |
| 5,404,712 A * | 4/1995 | Few et al. ............... 60/39.821 |
| 5,603,893 A | 2/1997 | Gundersen et al. |
| 5,666,929 A | 9/1997 | Knowlton et al. |
| 5,756,924 A | 5/1998 | Early |
| 5,778,860 A | 7/1998 | Garcia |
| 5,782,225 A | 7/1998 | Caggiano |
| 5,829,419 A | 11/1998 | Sadkin et al. |
| 5,845,480 A * | 12/1998 | DeFreitas et al. ............. 60/776 |
| 5,896,847 A | 4/1999 | Usuki |
| 5,983,871 A * | 11/1999 | Gordon et al. ............... 123/536 |
| 6,053,140 A | 4/2000 | Feichtinger et al. |
| 2002/0050489 A1* | 5/2002 | Ikegami et al. ........ 219/121.69 |

* cited by examiner

FUEL VAPORIZATION SYSTEMS FOR VAPORIZING LIQUID FUEL

CROSS-REFERENCE TO RELATED APPLICATION

This application claims the benefit of U.S. provisional application Ser. No. 60/338,904, filed Nov. 7, 2001.

BACKGROUND OF THE INVENTION

1. Field of the Invention

One aspect of the present invention generally relates to fuel vaporization systems for vaporizing fuel. Another aspect of the present invention relates to supplying the vaporized fuel to an engine. Yet another aspect of the present invention relates to systems for altering and controlling the chemical makeup of fuels and chemical processing of fuels and other compounds.

2. Background Art

Various systems and methods have been developed to improve combustion and reduce emissions from internal combustion engines. Proposed systems typically include vaporization chambers used to change the physical state of the fuel from liquid to vaporized fuel. Complicated systems have been developed to deliver the heat to the vaporization chamber. For example, engine exhaust gases, heated engine coolant, engine heat, and electrically heated plugs have been used to supply heat to vaporization chambers.

As shown in U.S. Pat. No. 5,782,225, a fluid vaporization system comprises a series of fluid inlets, discharge apertures and connecting passages. The communication between the inlets, apertures and passages effect heat transfer such that a vaporized fluid mixture is discharged from the first discharge aperture.

U.S. Pat. No. 5,896,847 discloses a liquified fuel vaporizing apparatus comprising a thick plate-shaped vaporizer constructed of material having high thermal conductivity such as an aluminum alloy. The vaporizer is in a heat exchanging relationship with the cylinder body of the engine. The cylinder body heats the liquid fuel in the vaporizer by thermal conduction.

U.S. Pat. No. 5,778,860 discloses a set of fittings for passing liquid fuel from the fuel pump or injection pump to the vaporization chamber. The fuel is heated by the vaporization chamber being in close proximity to the engine heat. Another set of fittings carries the partially vaporized fuel to the carburetor or injectors where it is mixed with air and carried in the usual manner to the combustion system.

U.S. Pat. No. 5,291,870 discloses a fuel vaporizing system which includes a series of baffles deposed such that the air and fuel pass along a tortuous passageway defined within the vaporizer. Exhaust gases provide heat to the vaporizer, and as the air and fuel pass along the passageway of the vaporizer, a homogeneous air/fuel vapor mixture is produced. The homogenous mixture exits the vaporizer and is supplied to the engine by way of an adaptor plate assembly.

Among other disadvantages, these systems suffer from their mechanical intricacies. Accordingly, it would be desirable to provide fuel vaporization systems that provide simplistic design, efficient operation, and the ability to alter and control the chemical makeup of the fuel.

SUMMARY OF THE INVENTION

One aspect of the present invention is fuel vaporization systems that provide simplistic design, and efficient operation, and the ability to alter and control the chemical makeup of the fuel. According to another aspect of the present invention, fuel vaporization systems are provided that convert liquid fuels, for example, but not limited to, gasoline, light crude, diesel, alcohol, heating fuels, JP8 (i.e. military fuel), and bio-diesel into vaporized fuel for combustion. The vaporization systems of the present invention produce vaporized fuel that is relatively lower in temperature than vaporized fuel produced by conventional systems. Advantageously, the cold fuel vapor requires less volume than relatively hotter fuel vapor produced by conventional systems, bringing about volumetric efficiencies in design.

One preferred system of the present invention is comprised of a fuel delivery system for delivering liquid fuel, and a vaporization system using photonic energy for vaporizing liquid fuel delivered by the fuel delivery system. The vaporization system can provide a vaporized fuel temperature of less than or about equal to an ambient temperature. The vaporized fuel temperature is preferably at least about 5 degrees cooler than the air adjacent to the vaporization system, i.e. the ambient temperature. The ambient temperature can be in the range of about 0° F. to about 120° F.

The preferred system can further comprise a chemical processing system for chemically processing the vaporized fuel. The chemical processing system can be comprised of a reformer capable of breaking hydrocarbon bonds. The reformer is capable of stripping hydrogen from the vaporized fuel to obtain hydrogen.

In a preferred system embodiment, the vaporization system is comprised of a backing plate having a surface with an indentation, a transmissive plate having a surface which is connected to the surface of the backing plate and forms a vaporization chamber bounded by a portion of the surface of the transmissive plate and the indentation, at least one laser source for imparting an energy beam through the transmissive plate and onto a portion of the vaporization chamber to vaporize liquid fuel flowing through the portion of the vaporization to obtain vaporized fuel. The vaporization chamber has an inlet for liquid fuel and an outlet for exiting vaporized fuel. The temperature of the vaporized fuel exiting the outlet of the vaporization chamber is preferably less than or about equal to the ambient temperature. The backing plate can be comprised of a crystalline material, for example, silica glass. The energy beam can be comprised of a beam of ultraviolet light having a frequency selected from the group comprising about 308 nanometers, about 248 nanometers, about 193 nanometers, and multiples thereof. The beam of the ultraviolet light can be comprised of at least one frequency. One laser source can impart a first energy beam to obtain harmonic pre-conditioning of the liquid fuel followed by a second energy beam onto the liquid fuel to vaporize the liquid fuel.

In another preferred system embodiment, the vaporization system is comprised of a misting nozzle for generating liquid fuel droplets having an inlet for receiving liquid fuel and an outlet for exiting liquid fuel droplets, and a vacuum pump having an inlet for receiving liquid fuel droplets being connected to the misting nozzle and an outlet for exiting vaporized fuel. The vacuum pump is capable of vaporizing liquid fuel droplets to obtain vaporized fuel which exits the outlet of the vacuum pump. The temperature of the vaporized fuel exiting the outlet of the vaporization chamber is less than or about equal to the ambient temperature. The misting nozzle is preferably capable of generating liquid fuel droplets with a diameter in the range of about 1 micron to about 5 microns. The vacuum pump can be comprised of an oil-less vacuum pump. The oil-less vacuum pump is preferably capable of a vacuum in the range of about 25 inches Hg to about 29.9 inches Hg. Thermal energy is preferably added to the liquid fuel droplets via an infrared energy source. The infrared energy source is preferably comprised of an infrared laser.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

A more complete appreciation of the invention and many of the attendant advantages thereof will be readily apparent from the following detailed description, particularly when considering in conjunction with the following drawing.

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
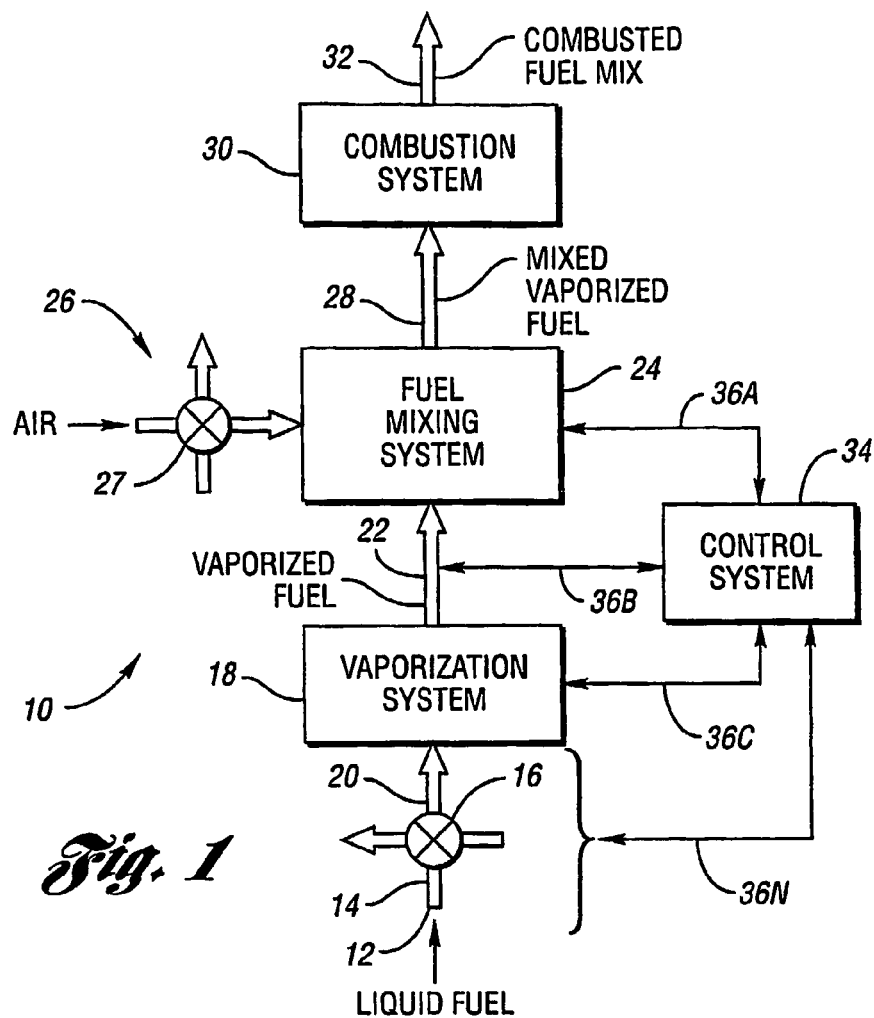
FIG. 1 schematically illustrates an engine system utilizing a vaporization system in accordance with a preferred embodiment of the present invention.

Accordingly, FIG. 1 schematically illustrates an engine system 10 utilizing a vaporization system in accordance with a preferred embodiment of the present invention. It is understood that FIG. 1 is a schematic illustration and some features of engine system 10 have been combined, rearranged, or omitted for the sake of illustration and clarity. It is fully contemplated that the engine system of the present invention can be any engine system for which clean emissions and high fuel economy is desired, for example, but not limited to, heating systems, gas engines, diesel engines, engines used in boats, airplanes, jet skis, automobiles, turbines, lawn mowers, and boilers.

Liquid fuel enters engine system at point 12 flows through fuel intake line 14 to enter liquid fuel valve 16 which regulates the amount of liquid fuel entering vaporization system 18 through liquid fuel outlet 20. Liquid fuel valve 16 functions to deliver the proper amount of liquid fuel to vaporization system 18 based on the particular application of the present invention. Preferably, the liquid fuel is pumped into fuel intake line 14 via a fuel pump. Additionally, the liquid fuel is pumped through a fuel filter to extract impurities before entering fuel intake line 14.

Once the liquid fuel is vaporized by the vaporization system to produce vaporized fuel (as will be discussed in more detail below), the vaporized fuel is fed to vaporized fuel line 22 which preferably transports the vaporized fuel to fuel mixing system 24. It is fully contemplated that vaporized fuel produced by utilizing a vaporization system of the present invention can be used for combustion without using fuel mixing system 24. The vaporized fuel can also be sent to a storage tank to be later mixed in the fuel mixing system. In some applications in accordance with the present invention, it may be beneficial to hold a quantity of vapor in a storage tank or ballast chamber.

Fuel mixing system 24 includes an air intake line 26, mixed vaporized fuel line 28, and an air-fuel mixer. Preferably, air-fuel mixer is connected to vaporized fuel line 22 and air intake line 26, which is preferably fitted with an air valve 27 for regulating the amount of air being introduced into the air-fuel mixer. Suitable air-fuel mixers are disclosed, for example, in U.S. Pat. Nos. 3,123,451 and 2,927,848, and are incorporated herein by reference.

Combustion system 30 receives mixed vaporized fuel through mixed vaporized fuel line 28. The mixed vaporized fuel is consumed by combustion system 30 to provide efficient combustion. Combustion system 30 can be comprised of an intake manifold and a gasoline vehicle engine to provide combustion of the liquid fuel. Examples of other suitable combustion systems include, but are not limited to, direct burning of fuel in a turbine engine, heating furnace, or boiler system. Combusted fuel exits combustion system 30 through combusted fuel outlet 32. Preferably, combusted fuel outlet 32 is an exhaust pipe. Examples of other suitable combusted fuel outlets include, but are not limited to, condensing chambers to reclaim water as desired in military vehicles. According to the present invention, the combusted mixed vaporized fuel results in relatively lower exhaust temperatures in comparison to engine systems using conventional vaporization systems.

Preferably, engine system 10 also includes control system 34. Control system 34 includes a plurality of sensors for sensing data and a control unit for controlling engine system parameters based on sensed data. Data sensed by the plurality of sensors is transmitted to the control unit through transmission lines 36A–N. The plurality of sensors can include a fuel valve sensor for sensing the position of the fuel valve, fuel flow sensor for sensing the flow rate of the fuel, fuel physical state sensor for sensing the physical state of the fuel, fuel temperature sensor for sensing the fuel temperature, vaporized fuel sensor flow sensor for sensing the flow rate of the vaporized fuel, vaporized fuel temperature sensor for sensing the temperature of the vaporized fuel, oxygen sensor for sensing oxygen content, air valve sensor for sensing the position of the air valve, air flow sensor for sensing the air flow rate, air temperature sensor for sensing the air temperature, etc. based on the particular implementation of the present invention. The control unit controls features of engine system 10, for example, fuel valve 16, air valve 27, etc. through transmission lines 36A–N in order to optimize the efficiency of engine system 10.

Having described the overall engine system 10, the following describes in detail the vaporization systems of the present invention. It should be understood that various embodiments of vaporization systems can be utilized to provide the advantages of the present invention, for example relatively lower (less than or about equal to the ambient temperature) vaporized fuel temperatures and relatively lower exhaust temperatures. Other advantages that can be achieved by the present invention depending on the embodiment, may include, but are not limited to, control of the chemical makeup of the fuel, simplistic design, clean burning fuels, enhanced efficiency, and relatively low levels of potentially harmful pollutants in the exhaust stream.

It is fully contemplated that the vaporization systems of the present invention can be modified, rearranged, or applied without modification for systems for altering and controlling the chemical makeup of fuels and/or chemical processing of fuels and other compounds. In general terms, these systems can modify chemical compounds, for example hydrocarbon chain(s) into different hydrocarbon(s). One way to accomplish this is to separate the hydrocarbon into sub units and facilitate the combination of sub units to obtain different chemical compound(s), for example hydrocarbons.

According to the present invention, some components of engine system 10 can be used in combination with other system components necessary to achieve the beneficial results of controlling chemical makeup, chemical processing, and/or conditioning fuel. Most notably, vaporization system 18 may be used in combination with other system components. For example, the vaporized fuel produced by the present invention can be subjected to simultaneous- or post-vaporization chemical processing. Benzene rings can be converted into different chemical components without the addition of chemical heat. Non-thermal energy, for example ultraviolet light, can be applied to benzene to break the benzene ring. Steam can then be added to the broken hydrocarbon ring to produce hydrogen, carbon dioxide, and carbon monoxide. As another non-limiting example, a fuel cell reformer can be used to achieve chemical processing of the vaporized fuels contemplated by the present invention. Examples of fuel cell reformation processes include, but are not limited to, introduction of steam, catalysis, controlled and starved oxidation, etc. Specifically, the fuel cell reformer can be used to extract hydrogen from the vaporized fuel or other compounds for fuel cells. Additionally, the extracted hydrogen can be introduced into an exhaust system to burn out noxious gases, thereby reducing pollution.

Figure 2:
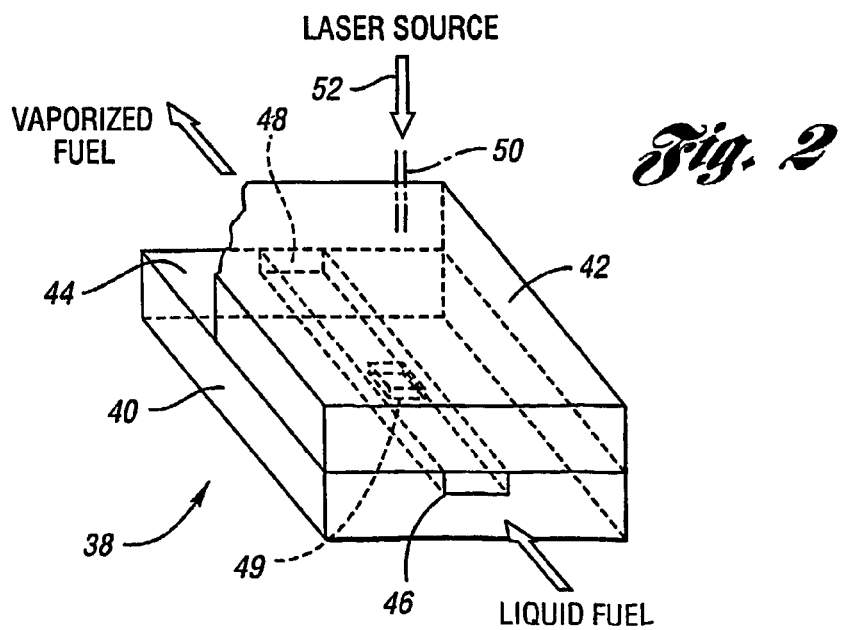
FIG. 2 is a perspective view of a vaporization system in accordance with a preferred embodiment of the present invention.

FIG. 2 is a perspective of a vaporization system in accordance with a preferred embodiment of the present invention. Vaporization system 38 is comprised of backing plate 40 and transmissive plate 42. Preferably, the shapes of plates 40 and 42 are similar and rectangular. The preferred dimensions of plates 40 and 42 are a length of about 1.5 inches, a width of about 1.5 inches, and a height of about 0.5 inches. Backing plate 40 is preferably rectangular in shape and constructed of a crystalline material, for example, silica glass or quartz. Other suitable backing plate materials include aluminum and carbon. Backing plate 40 includes surface 44 having notch 46 which forms chamber 48 when transmissive plate 42 is preferably affixed to a portion of surface 44 of backing plate 40 by adhesive bonding. Alternatively, mechanical bonding may be suitable for certain applications.

The cross section of notch 46 is preferably uniform and rectangular in shape for providing a thin film of liquid fuel and focusing energy on focal point or area 49 provided by energy beam 50 generated by laser source 52 on the thin film of liquid fuel flowing through chamber 48. It is fully contemplated that the cross sectional shape of notch can be shapes other than rectangular as long as the shape functions to focus energy on the liquid fuel, including, but not limited to, "v", circular, and ovular.

Figure 3:
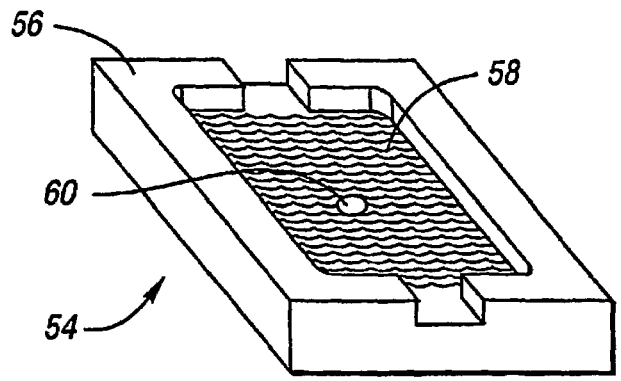
FIG. 3 is a perspective view of a vaporization system in accordance with another preferred embodiment of the present invention.

FIG. 3 depicts a perspective view of an alternative backing plate 54 in accordance with a preferred embodiment of the present invention. Surface 56 of backing plate 54 contains a plurality of shallow indentations 58 of various depths.

Upon affixing transmissive plate 42 of FIG. 2 to a portion of surface 56, a vaporization chamber 60 is formed between the plurality of shallow indentations 58 and transmissive plate 42. The dimensions of the vaporization chamber are preferably a length of about 1.0 inches, a width of about 0.75 inches, and a height of about 0.010 inches.

Transmissive plate 42 is constructed from a quartz material, or any other material that is suitable to transmit ultraviolet wavelengths. Preferably, the transmissivity of transmissive plate 42 is in the range of about 150 nanometers to about 15 microns.

Preferably, laser source 52 is a compact structure capable of focusing an energy beam 50 at point or area 49 on liquid fuel that is passing through vaporization chamber 48 or 60. It is understood that energy beam 50 can be delivered to the liquid fuel by any means sufficient to energize and excite the liquid fuel. The object is to deliver energy in the range absorbed by the fuel, typically ultraviolet and/or infrared. The amount of energy, frequency (or frequencies) are determined by the fuel and/or the desired amount of conversion of vapor per unit of time. Based on laser sources available and suitable for use in the present invention, energy beam 50 can be delivered at a frequency of about 308 nanometers, about 248 nanometers, about 193 nanometers, or multiples thereof. It is fully contemplated that other frequencies can be utilized, or combinations of frequencies based on the composition of the liquid fuel and available laser sources. It is understood that a single frequency is not required, and multiple frequencies can be utilized. For example, a number of lasers can be used to produce a blended harmonic that is imparted on the liquid fuel. Another laser can then be used to trigger the phase change. This example is referred to as harmonic pre-conditioning. As another non-limiting example, a discrete frequency can be spread into a wider frequency range once it contacts the liquid fuel.

The photonic energy contained within the ultraviolet light is absorbed by the fuels to provide energy for vaporization with minimal thermal energy to the vaporization chamber. Advantageously, this phenomena allows the phase shift of liquid fuel to vaporized fuel to occur at or below about ambient temperature in the range of about 0° F. to about 120° F., preferably in the range of 20° F. to about 120° F. It is understood that the ambient temperature can be measured as the temperature of the air in air intake line 26 which enters fuel mixing system 24 (i.e. temperature of the air adjacent to the vaporization system). Preferably, the vaporized fuel temperature is cooler than the ambient air intake temperature so that the vapor does not condense. Most preferably, the vaporized fuel temperature is at least about 5 degrees cooler than the ambient temperature.

It is fully contemplated that the vaporization chamber 48 can be subject to a vacuum to facilitate the phase shifting step with less energy required than without the vacuum. Preferably, the vacuum used to achieve this purpose can deliver a vacuum in the range of about 20 inches Hg to about 29 inches Hg. Additionally, the temperature for conducting the vaporization can be reduced by cooling the liquid fuel prior to exposure to ultraviolet light or cooling the entire vaporization system 38.

Figure 4:
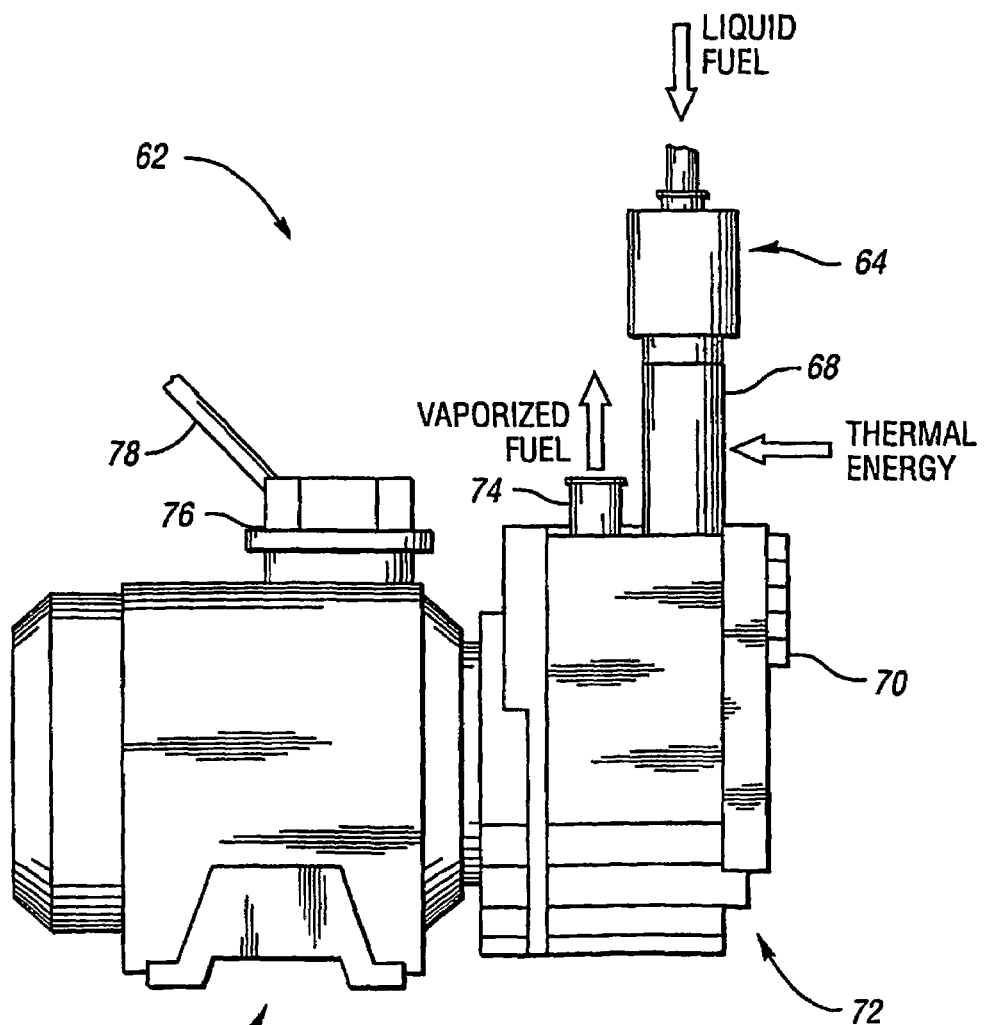
FIG. 4 schematically illustrates a vaporization system in accordance with another preferred embodiment of the present invention.

FIG. 4 schematically illustrates a vaporization system in accordance with another preferred embodiment of the present invention. Vaporization system 62 is comprised of misting nozzle 64 connected to and in communication with vacuum pump 66. Misting nozzle 64 receives liquid fuel from liquid fuel outlet 20 and is capable of breaking up the liquid fuel into tiny droplets, preferably in the range of about 1 micron to about 5 microns. Preferably, misting nozzle 64 is of the ultrasonic type. It is fully contemplated that any device capable of breaking up the liquid fuel into tiny droplets can be used, for example, but not limited to nebulizers, high pressure misters, etc.

Vacuum pump 66 is comprised of pump inlet 68, pump inlet filter 70, vacuum 72, pump outlet 74, electrical unit 76, and electrical transmission line 78. Vacuum pump 66 is preferably an oil-less vacuum pump, and more preferably the K&F UN 810.3 FTP oil-less vacuum pump available from Neuberger, Inc. of Trenton, N.J. Pump inlet 68 receives the liquid fuel droplets produced by misting nozzle 64. Vacuum 72 can preferably deliver a vaccum of about 25 inches Hg to about 29 inches Hg. Due to the reduced pressure of the liquid fuel droplets and the increase in surface area of the liquid fuel, the fuel droplets are capable of absorbing the necessary energy to shift from liquid to vapor. This system works by extracting thermal energy from the air surrounding the liquid droplets. Pump outlet 74 provides vaporized fuel to fuel mixing system 24. Electrical unit 76 and electrical transmission line 78 provides power to drive vacuum pump 66.

In an alternative embodiment based on vaporization system 62, thermal energy is added to the liquid fuel droplets produced by misting nozzle 64 via an infrared energy source, preferably an infrared laser. The preferred frequency of the infrared laser is about 3 microns to about 10 microns and most preferably from about 5 microns to about 10 microns. Advantageously, the infrared laser provides just enough energy to supply the needed latent heat of vaporization under a vacuum condition preferably in the range of about 20 inches Hg to about 29 inches Hg so as to keep the temperature of the resulting vaporized fuel at or below the ambient temperature.

Another preferred embodiment of the present invention is related to a fuel vaporization chamber utilizing a cold plasma system. According to this embodiment, a mist of liquid fuel is drawn or blown across a cold ion discharge or cold plasma chamber so that the liquid fuel mist is subjected to an electric field. The fuel droplets in the liquid fuel absorb energy from the electric field so that vaporized fuel exits the cold ion discharge or cold plasma chamber.

While embodiments of this invention have been illustrated and described, it is not intended that these embodiments illustrate or describe all possible forms of the invention. The fuel vaporization systems disclosed can be equally applied to solid sources, such as coal or other compounds, and other power generating systems, such as furnaces. Rather, the words used in the specification are words of description rather than limitation, and it is understood that various changes may be made without departing from the spirit and scope of the invention.

What is claimed is:

1. A system for vaporizing liquid fuel, the system comprising:
    a fuel delivery system for delivering liquid fuel;
    a vaporization system for vaporizing liquid fuel delivered by the fuel delivery system, the vaporization system providing a vaporized fuel temperature of at least about 5 degrees cooler than the ambient temperature of air adjacent to the vaporization system,
    wherein the vaporization system is comprised of:
    a backing plate having a surface with an indentation;
    a transmissive plate having a surface which is connected to the surface of the backing plate and forms a vaporization chamber bounded by a portion of the surface of the transmissive plate and the indentation, the vaporization chamber having an inlet for liquid fuel and an outlet for exiting vaporized fuel; and
    at least one laser source for imparting an energy beam through the transmissive plate and onto a portion of the vaporization chamber to vaporize liquid fuel flowing through the portion of the vaporization chamber to obtain vaporized fuel which exits the outlet of the vaporization chamber.

2. The fuel vaporization system of claim 1, wherein the backing plate is comprised of a crystalline material.

3. The fuel vaporization system of claim 2, wherein the crystalline material is comprised of silica glass.

4. The fuel vaporization system of claim 1, wherein the transmissive plate is comprised of quartz.

5. The fuel vaporization system of claim 1, wherein the energy beam is comprised of at least one beam of ultraviolet light.

6. The fuel vaporization system of claim 1, wherein the frequency of the beam of ultraviolet light is selected from the group comprising about 308 nanometers, about 248 nanometers, about 193 nanometers, and multiples thereof.

7. The fuel vaporization system of claim 5, wherein the frequency of the at least one beam of ultraviolet light is comprised of at least one frequency.

8. The fuel vaporization system of claim 5, wherein the at least one laser source imparts a first energy beam to obtain harmonic pre-conditioning of the liquid fuel followed by a second energy beam onto the liquid fuel to vaporize the liquid fuel.

9. The system of claim 1 wherein the ambient temperature is in the range about 20° F. to about 1200° F.

10. The system of claim 1 further comprising a chemical processing system for chemically processing the vaporized fuel.

11. The system of claim 10 wherein the chemical processing system is comprised of a reformer capable of breaking hydrocarbon bonds.

12. The system of claim 11 wherein the reformer is capable of stripping hydrogen from the vaporized fuel to obtain hydrogen, the hydrogen being at least used in fuel cells.

13. A system for processing chemical compounds, the system comprising:
    a backing plate having a surface with an indentation;
    a transmissive plate having a surface which is connected to the surface of the backing plate and forms a vaporization chamber bounded by a portion of the surface of the transmissive plate and the indentation, the vaporization chamber having an inlet for a chemical compound and an outlet for exiting of an at least one altered chemical compound; and
    at least one laser source for imparting an energy beam through the transmissive plate and onto a portion of the vaporization chamber to alter the chemical compound present at the portion of the vaporization chamber to obtain the at least one altered chemical compound which exits the outlet of the vaporization chamber at a temperature of at least about 5 degrees cooler than the ambient temperature of air adjacent to the outlet.

* * * * *

UNITED STATES PATENT AND TRADEMARK OFFICE
CERTIFICATE OF CORRECTION

PATENT NO. : 7,066,156 B2
APPLICATION NO. : 10/494878
DATED : June 27, 2006
INVENTOR(S) : Douglas Magyari It is certified that error appears in the above-identified patent and that said Letters Patent is hereby corrected as shown below:

Column 8, Line 33, Claim 9:

Delete "1200°F" and insert therefor --120°F--.

Signed and Sealed this

Twelfth Day of September, 2006

JON W. DUDAS
*Director of the United States Patent and Trademark Office*